US009838828B2

(12) United States Patent
Kakani

(10) Patent No.: US 9,838,828 B2
(45) Date of Patent: Dec. 5, 2017

(54) METHOD FOR SETTING UP PERIPHERAL DEVICES DOCKING SESSION FOR BETTER USER EXPERIENCE

(71) Applicant: QUALCOMM TECHNOLOGIES INTERNATIONAL, LTD., Cambridge (GB)

(72) Inventor: Naveen Kumar Kakani, Coppell, TX (US)

(73) Assignee: QUALCOMM TECHNOLOGIES INTERNATIONAL, LTD., Cambridge (GB)

(*) Notice: Subject to any disclaimer, the term of this patent is extended or adjusted under 35 U.S.C. 154(b) by 366 days.

(21) Appl. No.: 14/627,155

(22) Filed: Feb. 20, 2015

(65) Prior Publication Data

US 2015/0241920 A1    Aug. 27, 2015

Related U.S. Application Data

(60) Provisional application No. 61/943,110, filed on Feb. 21, 2014, provisional application No. 61/944,411, filed on Feb. 25, 2014.

(51) Int. Cl.
*H04M 1/00* (2006.01)
*H04W 4/00* (2009.01)
*G06F 1/16* (2006.01)
*H04M 1/725* (2006.01)

(52) U.S. Cl.
CPC ........... *H04W 4/008* (2013.01); *G06F 1/1632* (2013.01); *H04M 1/7253* (2013.01); *H04M 2250/06* (2013.01)

(58) Field of Classification Search
CPC ................. G06F 1/1632; H04M 1/7253
See application file for complete search history.

(56) References Cited

U.S. PATENT DOCUMENTS

| 2014/0010220 | A1 | 1/2014 | Huang |
| 2014/0013014 | A1 | 1/2014 | Huang |
| 2015/0056920 | A1* | 2/2015 | Huttunen ................. H04B 7/26 455/41.2 |

* cited by examiner

*Primary Examiner* — Zachary K Huson
(74) *Attorney, Agent, or Firm* — The Marbury Law Group/Qualcomm

(57) ABSTRACT

The present invention relates generally to wireless networking, and more particularly to methods and apparatuses for providing flexible WiFi docking with minimal overhead. According to certain aspects, embodiments of the invention include methods and apparatuses that allow a WD to select peripherals in a configuration that is useful for the WD from a Topology point of view. According to certain other aspects, embodiments of the invention include methods and apparatuses that allow peripherals to be used as part of the Docking Session, but does not require using all the peripherals all the time. According to certain additional aspects, embodiments of the invention include methods and apparatuses that allow for dynamically switching the use of peripherals with minimal overhead. According to still further additional aspects, embodiments of the invention include methods and apparatuses for signaling user authentication functionality for certain peripherals to be used in a docking session.

23 Claims, 3 Drawing Sheets

METHOD FOR SETTING UP PERIPHERAL DEVICES DOCKING SESSION FOR BETTER USER EXPERIENCE

CROSS-REFERENCE TO RELATED APPLICATIONS

This application claims the benefit under 35 USC 119(e) of prior co-pending U.S. Provisional Patent Application No. 61/943,110, filed Feb. 21, 2014, and U.S. Provisional Patent Application No. 61/944,411, filed Feb. 25, 2014, each of which is hereby incorporated by reference in its entirety.

FIELD OF THE INVENTION

The present invention relates generally to wireless networking, and more particularly to methods and apparatuses for providing flexible WiFi docking with minimal overhead.

BACKGROUND OF THE INVENTION

Currently, the WiFi Docking program in the WiFi Alliance is defining a set of protocols between a Wireless Dockee (WD) and Wireless Docking Center (WDC) to facilitate WiFi docking. In general, WiFi docking allows a roaming WiFi device to access peripherals such as printers or displays that are connected either wired or wirelessly in a WiFi network. One goal of the WiFi docking program of the WiFi Alliance is to not require any changes on the peripheral side to allow for current WiFi peripherals to be used for docking.

As part of a docking session setup, a WDC provides the following to the WD: (1) A list of peripherals that are available and with which the WD can have a docking session facilitated by the WDC; (2) The state of each peripheral is signalled to the WD as: (a) Available, (b) Occupied, (c) Sleep, (d) Disconnected, or (e) Unpaired; and (3) A single sign-on facility for a WD to facilitate security setup with the peripherals, which allows the WDC to facilitate security setup between WD and the peripherals.

Once the WD selects a "Peripheral," the WDC expects that the peripheral is in the state "Available" for use by the WD during the docking session. This will also allow for user experience a WD would expect from the peripherals offered by WDC. However, this would mean the WDC should have already set up a link with the selected peripheral, thereby constraining the use of the selected peripheral by other devices in the environment.

For example, if a printer device is offered by the WDC as a peripheral, then the printer should be already configured to connect to the WDC, as an example via WiFi Direct (possibly using persistent connection). The peripheral should also be available for use immediately once the WD picks the peripheral.

More particularly, in a home environment, a WD device would like to use the printer via the WDC if it is already docked to allow for better power saving (i.e. there is no need to establish connection with the printer separately). But if the WD selects the peripheral, and it doesn't use it, then the peripheral cannot be used by another device (i.e. it cannot be part of another WiFi Direct Group, until and unless the printer creates a Group). The trade off in this scenario is providing a consistent docking experience (i.e. connectivity and use of peripherals) and also at the same time allowing autonomy for peripherals to be used flexibly (i.e. not constrained because they are used in docking environment).

Conventionally, either the peripheral was part of the docking session or removed from the docking session. This increases the overhead (i.e. the WD has to keep adding and removing the peripheral) and doesn't allow for a WD to dynamically switch the use of a peripheral.

Accordingly there remains a need in the art for a solution addresses the problem above among others.

SUMMARY OF THE INVENTION

The present invention relates generally to wireless networking, and more particularly to methods and apparatuses for providing flexible WiFi docking with minimal overhead. According to certain aspects, embodiments of the invention include methods and apparatuses that allow a WD to select peripherals in a configuration that is useful for the WD from a topology point of view. According to certain other aspects, embodiments of the invention include methods and apparatuses that allow peripherals to be used as part of the docking session, but does not require that all the peripherals are used all the time. According to certain additional aspects, embodiments of the invention include methods and apparatuses that allow for dynamically switching the use of peripherals with minimal overhead. According to still further additional aspects, embodiments of the invention include methods and apparatuses for signaling user authentication functionality for certain peripherals to be used in a docking session.

In accordance with these and other aspects, a method embodiments of the invention includes initiating a WiFi docking session between a WiFi Dockee (WD) and a WiFi Docking Station (WDC); providing a list of peripherals that are accessible by the WDC to the WD, wherein one of the peripherals is in a first state; and allowing the WD to select the one peripheral to include in the WiFi docking session in a second state that is different than the first state.

In additional furtherance of the above and other aspects, a method according to embodiments of the invention includes initiating a WiFi docking session between a WiFi Dockee (WD) and a WiFi Docking Station (WDC); providing a list of peripherals that are accessible by the WDC to the WD; allowing the WD to select one of the peripherals to include in the WiFi docking session along with user authentication credentials; and determining, by the WDC, whether to accept the selection based on the user authentication credentials.

In yet additional furtherance of the above and other aspects, a system according to embodiments of the invention includes a WiFi Dockee (WD); a WiFi Docking Station (WDC); a plurality of peripherals that are accessible by the WDC, wherein one of the peripherals is in a first state; and a signaling protocol between the WD and the WDC that allows the WD to select the one peripheral to include in a WiFi docking session between the WD and WDC in a second state that is different than the first state.

BRIEF DESCRIPTION OF THE DRAWINGS

These and other aspects and features of the present invention will become apparent to those ordinarily skilled in the art upon review of the following description of specific embodiments of the invention in conjunction with the accompanying figures, wherein.

DETAILED DESCRIPTION OF THE PREFERRED EMBODIMENTS

The present invention will now be described in detail with reference to the drawings, which are provided as illustrative examples of the invention so as to enable those skilled in the art to practice the invention. Notably, the figures and examples below are not meant to limit the scope of the present invention to a single embodiment, but other embodiments are possible by way of interchange of some or all of the described or illustrated elements. Moreover, where certain elements of the present invention can be partially or fully implemented using known components, only those portions of such known components that are necessary for an understanding of the present invention will be described, and detailed descriptions of other portions of such known components will be omitted so as not to obscure the invention. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The present invention will be described below in conjunction with embodiments compatible with standards such as those of the WiFi Alliance Docking Program. However, the invention is not limited to these embodiments, and the principles of the invention can be extended using other standards or proprietary or other wireless environments such as wireless PAN networks built on Zigbee, car docking technologies, etc.

Figure 1:
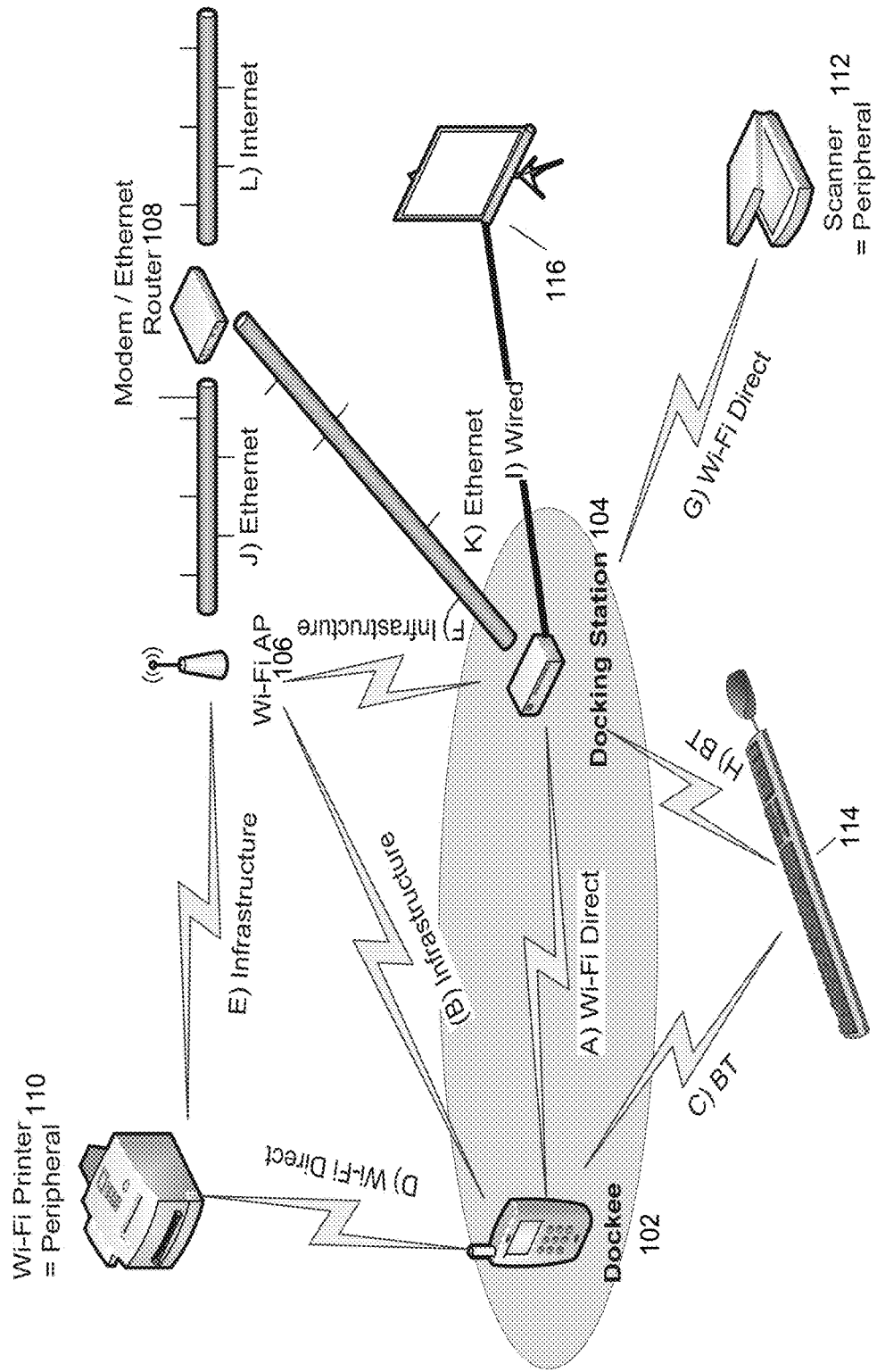
FIG. 1 is a block diagram illustrating an example docking environment according to embodiments of the invention.

FIG. 1 is a block diagram illustrating aspects of an example docking environment according to embodiments of the invention.

In the example, a "Dockee" 102 (i.e. WD) is the device that is being docked to a "Docking Station" device 104 (i.e. WDC). Both the WD 102 and the WDC 104 are connected to a Wi-Fi Infrastructure (e.g. a wireless home network provided by a Wi-Fi access point (i.e. Wi-Fi AP 106) connected to the Internet via a cable, DSL or other modem 108) via links "B" and "F" respectively, in addition to being directly linked together via link "A". Some peripherals are also connected to the Wi-Fi AP 106 (e.g. printer 110 connected via link "E"). Peripherals can be connected to WDC 104 over wired connections (e.g. display 116 connected via link "I"), or via wireless technologies other than Wi-Fi (e.g. Bluetooth keyboard 114 connected via link "H"), in addition to Wi-Fi connections (e.g. scanner 112 connected via link "G").

In embodiments, the "Dockee" device WD 102 is typically included in any portable device (e.g. iPhone or similar smartphone, iPad or similar tablet computer, smart watch, laptop or notebook computer, etc.) that has built-in WiFi (i.e. IEEE 802.11) and possibly other wireless (e.g. Bluetooth) transceiver capabilities, as well as WD (i.e. per the WiFi Alliance Docking Program) functionality such as those provided in chipsets and associated firmware from manufacturers such as CSR. Those skilled in the art will be able to implement the Dockee functionality of the invention by adapting such chipsets and/or firmware after being taught by the present examples. In an example where WD 102 is implemented in a computer running Windows OS, WD 102 can further include application and/or driver software running under Windows that allows a user to interact and control certain WD 102 functions such as selecting peripherals to include in a docking session, setting up profiles to select peripherals based on the environment (e.g. home, enterprise, etc.), etc. Similar user interface functionality can be included in other types of devices where WD 102 is implemented. It should be noted that, to be capable of supporting functionalities such as WiFi Direct, Miracast Service, etc., a software driver will typically be required along with specific hardware. For example, to be certified by the WiFi Alliance, particular driver and hardware capabilities associated with WD functionality are required to be supported by the device. However, such implementation specific details will be omitted here for sake of clarity of the invention.

In embodiments, the "Docking Station" device WDC 104 is either a standalone device (e.g. a device similar to a wired docking system), a peripheral device (e.g. display screen) that has integrated WiFi (i.e. IEEE 802.11) and WDC (i.e. per the WiFi Alliance Docking Program) functionality, or it can be a device such as a laptop/desktop computer that can allow a dockee to use its built-in peripherals (e.g. built-in monitor) or peripherals connected to it either by wired connection (e.g. USB, HDMI, DVI, etc.) or wirelessly (e.g. Bluetooth, WiFi, WiFi Direct, etc.). In embodiments, WDC functionality is implemented by chipsets and associated firmware from manufacturers such as CSR. Those skilled in the art will be able to implement the principles of the invention by adapting such chipsets and/or firmware after being taught by the present examples. Moreover, similar to WD 102, to be capable of supporting functionalities such as WiFi Direct, Miracast Service, etc., a software driver will typically be required along with specific hardware for WDC functionality.

The peripherals (i.e. PFs) available for a docking session (i.e. potentially belonging to a logical group called a Wireless Docking Environment (WDN)) in this example include: a WiFi printer 110 connected to WD 102 via a WiFi Direct link "D" or via the WDC 104 and WiFi infrastructure (links "E" and "F"); a display 116 connected via wired (e.g. USB, HDMI, etc.) interface (i.e. link "I") to WDC 104; a WiFi scanner 112 connected to WDC 104 via a WiFi Direct link "G"; and a keyboard 114 connected to both WD 102 and WDC 104 via Bluetooth links "C" and "H" respectively. It should be apparent that these are examples only and that many other types of peripheral devices can be used.

It should be noted that other types of peripherals can be included in a docking session in addition to, or alternatively to, the peripherals shown in FIG. 1. For example, certain additional peripherals connected via WiFi AP 106 and/or router 108 can also be included in a docking session. Those skilled in the art will understand how to extend the principles of the invention to these other types of connections after being taught by the present examples. Moreover, the specific signaling for allowing a WD to actually communicate with and access the functionality of specific peripherals are known to those skilled in the art and details thereof will be omitted here for clarity of the invention.

In this example, the current version of the Wireless Docking Technical Specification (e.g. Version 0.26, hereinafter "[1]" or "the standard," the contents of which are incorporated herein by reference) allows WD 102 to use all the peripherals described above as part of its docking session with WDC 104. However, according to embodiments of the invention, WD 102 might not choose all the peripherals at the same time and also not connect to them via the same topology (e.g. Direct/Relay as defined in [1]). In [1], the possible states of the peripherals are defined by the following structure:

```
<xsd:simpleType name="peripheralFunctionState">
    <xsd:restriction base="xsd:string">
        <xsd:enumeration value="available"/>
        <xsd:enumeration value="occupied"/>
        <xsd:enumeration value="sleep"/>
        <xsd:enumeration value="disconnected"/>
        <xsd:enumeration value="unpaired"/>
    </xsd:restriction>
</xsd:simpleType>
```

Where:
- 'available'—The peripheral function is available for use.
- 'occupied'—The peripheral function is occupied.
- 'sleep'—The peripheral function needs to be woken up to be used.
- 'disconnected'—The peripheral function has been disconnected. This is more relevant for Wired Peripherals.
- 'unpaired'—The peripheral function is no longer paired with the WDC.

The states of all the peripherals available for a docking session are advertised by the WDC 104 when WD 102 engages in a discovery session with WDC 104. However, the present inventors recognize at least the following issues with some versions of the standard.

For example, there is no option for WD 102 to select a peripheral and explicitly ask for that peripheral to be used in a certain "State". For example, a peripheral that is 'Unpaired' with WDC 104 cannot be requested by WD 102 to be paired and used in a docking session for WD 102. Also, if WD 102 wants to add a peripheral but does not need to use it except for limited times (e.g. a Printer), and if WDC 104 advertises that the peripheral is available, there is no way to make the peripheral part of WD 102's WDN and also allow other WD's to use it while it is not needed.

Along the same lines, WDC 104 cannot know the state in which WD 102 desires a peripheral to be in. The present inventors have determined that it would be desirable to have signaling (i.e., a WD can ask for the "state" to be set in specific manner), that would allow the WDC to provide the peripheral in the required "State" (as desired by the WD), otherwise the peripheral is still selected in the "State" that the WDC can offer to WD.

To address these and other issues, embodiments of the invention implement new behaviour and functionality at WDC 104 and WD 102. First, WD 102 can select/signal the "State" of the peripheral that it so desires to include in the WDN. In embodiments, the allowed "State" selections of the Peripheral are: (1) Available; (2) Disconnected (not using now but can use it later); and (3) Unpaired. Second, the WD 102 can also signal in the peripheral selection to WDC 104 if it still wants to include the peripheral in its docking session, even if the WDC 104 is not able to provide it in the state it so desires.

Figure 2:
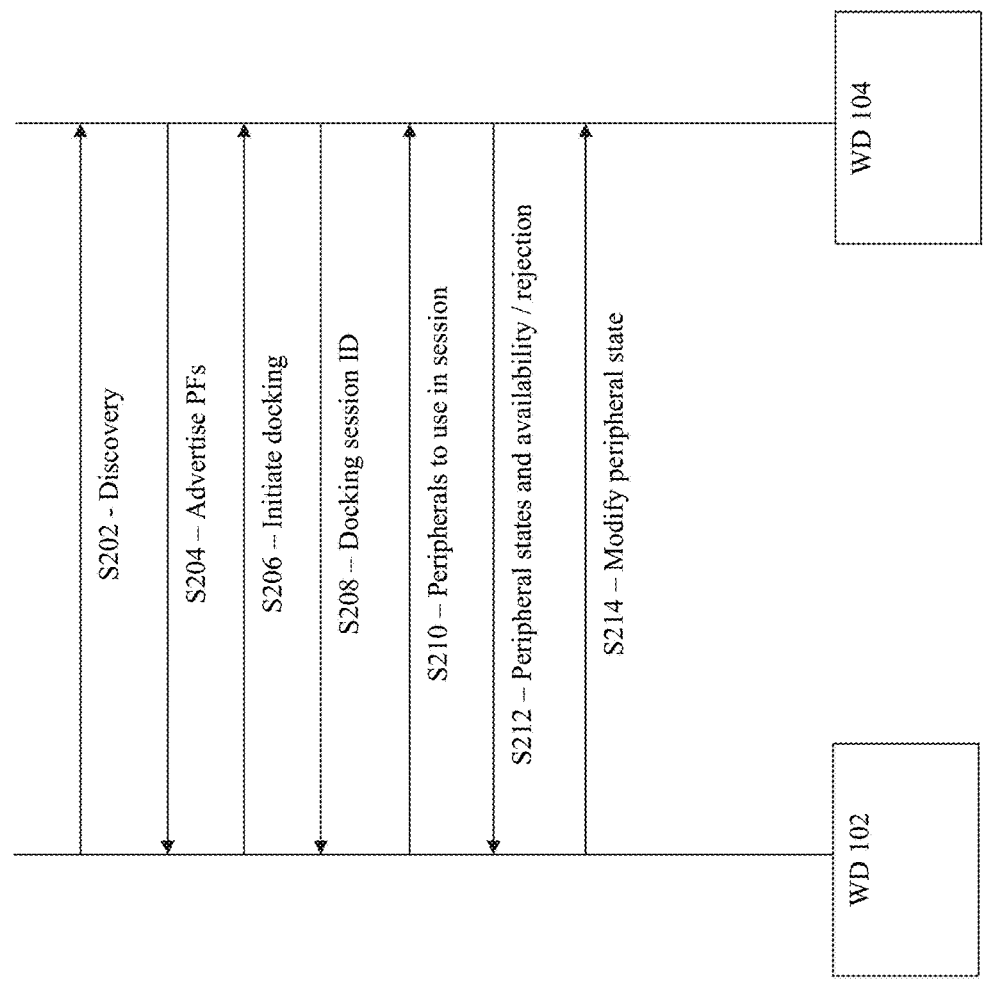
FIG. 2 is a diagram illustrating example signaling for implementing peripheral state and switching functionality according to embodiments of the invention.

FIG. 2 is a diagram illustrating an example signaling between a WD and WDC to implement this new behavior and functionality according to embodiments of the invention. This signaling will be described in an example implementation of the invention in a wireless system according to the WiFi Docking Alliance standards. However, the invention is not limited to this example. Moreover, it should be apparent that in this and other implementations, that many additional signaling and functionality may be possible. However, details thereof will be omitted here for sake of clarity of the invention.

First, in S202, in a discovery session, WD 102 seeks a docking service with WDC 104. This can be done in a conventional manner, through a SeekService method, for example.

In response, in S204 WDC 104 advertises the PFs available for a docking session using a conventional method such as an AdvertiseService. This list can further include the individual IDs of the PFs and the states of the PFs as set forth above.

Next, in S206, perhaps in response to a user request of a device implementing the WD 102, the WD 102 requests a docking session with WDC 104. This can be done, for example, using a conventional CreateDockingSession method, for example. In this example, in S208, WDC 104 returns a DockingSessionId, which is a unique identification string of the docking session, and can be a random string generated by the WDC 104.

Next, according to embodiments of the invention, in S210 WD 102 signals the peripherals it wants to use, as well as the states it wants them in.

The current peripheral selection functionality in an example implementation according to the standard defined in [1] is signalled as:

| PfSelection( ) | DockingSessionId - IN |
| | PfSelectionStyle - IN |
| | PfSelectionList - IN |
| | DetailedPfInfoList - OUT |
| | NewEventSubURL - OUT |

In this example implementation, the WD 102 identifies its docking session using the 'DockingSessionId' action argument, and its desired set of PFs by either: a) setting the value of the 'PfSelectionStyle' action argument to "all" to indicate accepting the default WDN, or b) setting the value of the 'PfSelectionStyle' action argument to "specific", and including a list of PF IDs in the 'PfSelectionList' action argument.

However, the present inventors recognize that in the existing standard [1], there is no provision for any signaling from the WD 102 regarding the state in which the WD 102 would want to include any peripherals for a docking session. To allow the flexibility of the present invention, example embodiments include alternative or additional signaling from WD 102 to WDC 104 in S210 as follows.

When setting the value of the 'PfSelectionStyle' action argument to "specific", along with including a list of PF IDs in the 'PfSelectionList' action argument, in embodiments the WD 102 also includes for each of the peripherals: (1) the state of the peripheral in which the WD 102 desires to use the peripheral (e.g. include a parameter "State" which is of type "PeripheralFunctionStateType"); and (2) an indication whether the peripheral should be included in the docking session only in the "State" signaled or whether it can it be included even if it is not available in the requested "State" (e.g. include a parameter "RequiredState" which can be of type Boolean). Note that the content of this field is used only for peripherals whose desired state (e.g. the included "State" parameter) is signaled to be "Available". If the State is any other value other than "Available" this field can be ignored and the peripheral is included as part of the docking session.

It should be apparent that many variations can be made to the above signaling to achieve the same or similar effect, and the invention is not limited to this example. Similar capability can be provided when using the selection style (PfSelectionStyle) to "all" i.e., including all the offered peripherals by WDC 104 to the docking session.

The WDC 104 can work on providing the peripherals in the states that are requested by the WD 102. However, it is not likely to be successful for all peripherals. In S212, the WDC 104 signals back to the WD 102 the "State" of the peripherals that it is finally able to provide. In embodiments, this information is included either in or as an additional field to "DetailedPfInfoList—OUT" data that is included in the response from the WDC 104 to the WD 102 for the WD 102's PfSelection Request in S210. But if the WD 102 signals to the WDC 104 that it wants to include the peripheral irrespective of its preferred status in the docking session, the WDC 104 does the following: (1) It includes the peripheral in the docking session of the WD 102; and (2) If the WD 102 has signalled the Preferred State of the peripheral as "Available" but the WDC 104 is not able to provide it in "Available" state, the WDC 104 will continue monitoring the peripheral and once it can provide the peripheral to WD 102 in the state it so desires it updates the peripheral information to the WD 102 with the updated State (not shown in FIG. 2).

In embodiments, S212 can also include a Rejection of any or all of the peripherals included in the PfSelection Request in S210. In addition, this rejection can include a reason why the request was rejected, such as if user authentication is required, insufficient resources (e.g. memory or bandwidth), usage conflict, etc. In embodiments, this can be included in OUT data of a PfSelection Request returned by the WDC 104.

As further shown, in S214, during a docking session WD 102 can choose to deselect a peripheral. This functionality already exists in [1]. However, embodiments of the invention further allow WD 102 in S214 to further signal the "State" to either "Unpaired or Disconnected" but not remove the peripheral from its Docking Session. For example, the Deselect Procedure can be adapted to include the "State" information of the Peripheral that is signalled to the WDC 104 during the "PF De-Selection Procedure". As such, the peripheral information, if it includes the "State" information, then the WD 102 is asking for a change in State of the peripheral. This would also leave up to the WDC 104 implementation whether to remove the ASP session between the WDC 104 and the peripheral. If the WDC 104 chooses to leave the ASP session (i.e. persistent connection), then the WDC 104 can re-establish the session between the WDC 104 and the peripheral for the use of WD 102 fairly quickly. If the signalling in S214 does not include the "State" information, then the WD 102 is asking to remove the peripheral, as currently exists in [1].

In alternative implementations of S214, the WD 102 can signal the state of the desired peripherals included in its docking session explicitly as a separate UpNP message exchange "Update Peripheral State use for Docking".

In still further alternative implementations of S214, embodiments of the invention adapt the existing WD Specific WDN Create/Modify/Delete Procedure to allow WD 102 not just include or delete a peripheral but also include the "State" of the peripheral that is desired to be included as part of the docking session. This functionality is realized by the following two functions:

1) WDN Create

| WdnCreate( ) | PfSelectionStyle - IN |
| | PfSelectionList - IN |
| | WdnId - OUT |

2) WDN Modify

| WdnCreate( ) | PfSelectionStyle - IN |
| | PfSelectionList - IN |
| | WdnId - OUT |

The changes to the "PfSelectionList" described above can be applied to these functions as well to realize the proposed flexibility in WD 102 selecting the peripherals for the docking session (i.e. the peripherals selected constitutes a WDN). Note that when modifying peripherals, it is possible to include only the peripherals that are either added to the docking session, or removed from the docking session or peripherals with a change in "State". It is not required to include all the peripherals that are part of the docking session.

In additional or alternative embodiments, the docking functionality of the present invention allows the use of peripherals based on the level of authorization each user has.

Figure 3:
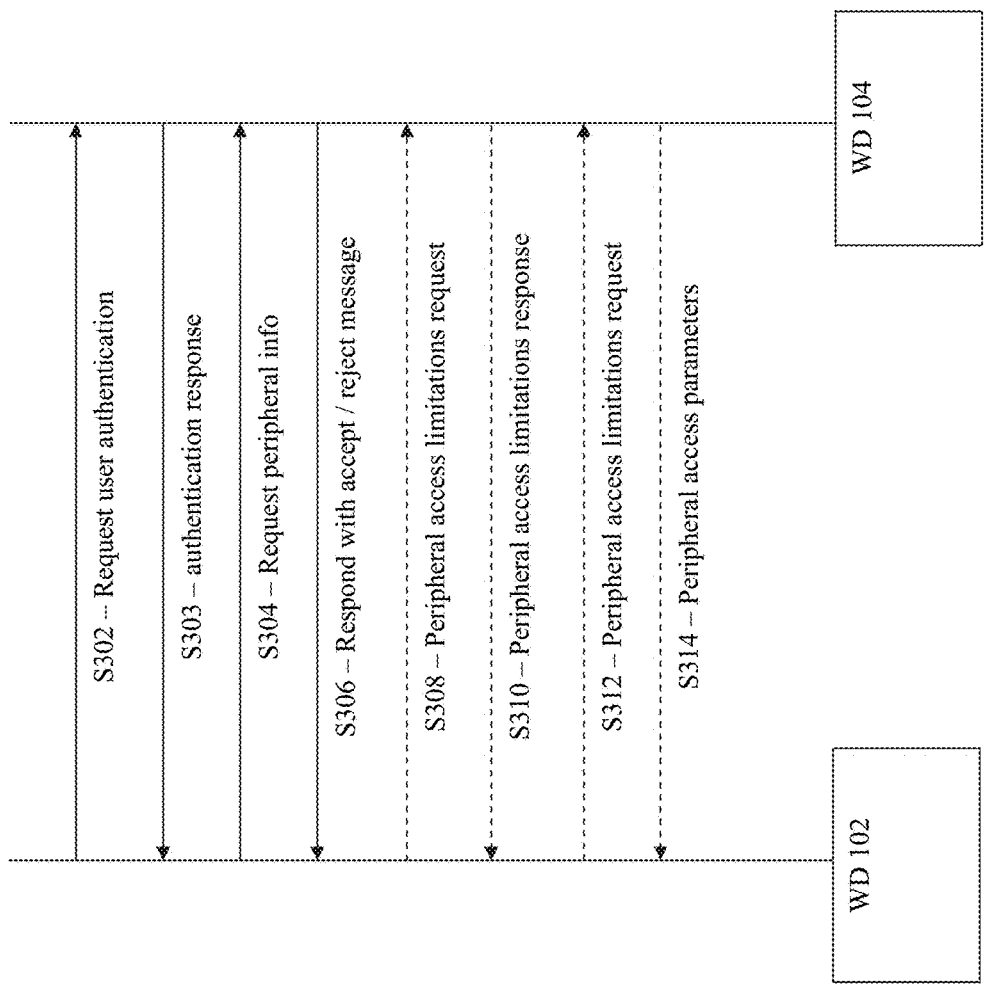
FIG. 3 is a diagram illustrating example signaling for implementing user authentication functionality for a docking session according to embodiments of the invention.

FIG. 3 is a diagram illustrating an example signaling between a WD and WDC to implement this new behavior and functionality according to embodiments of the invention. This signaling will be described in an example implementation of the invention in a wireless system according to the WiFi Docking Alliance standards. However, the invention is not limited to this example. Moreover, it should be apparent that in this and other implementations, that many additional signaling and functionality may be possible. However, details thereof will be omitted here for sake of clarity of the invention. It should be further noted that this functionality can be included together with, or separately from, the peripheral state functionality described in connection with FIG. 2.

First in S302 (typically after similar signaling described in connection with S202 to S208 of FIG. 2), WD 102 will use the docking session ID that is provided to WD 102 by WDC 104, along with the credentials (e.g. User Type and Passphrase) to authenticate the user. In embodiments, the user authentication is realized by the following example method:

| UserTypeAuth( ) | DockingSessionId - IN |
| | UserType - IN |
| | PassPhraseDigest - IN |

In S303, WDC 104 responds whether the user is authorized to use the peripherals the user has requested to use.

Based on the provided user authentication (e.g. from preset methods such as providing Guest access via a preset passphrase that is provided to the user if allowed to use the system/peripherals), WDC 104 can grant access to various peripherals that are offered to the WD 102 by WDC 104. This functionality can be realized by WDC 104 using the following example method:

| GetPfInfo( ) | QueryInput - IN |
| --- | --- |
| | PfInfoList - OUT |

In this example, in S304 WD 102 uses the 'GetPfInfo' action and supplies as an input argument 'QueryInput', through which the WD 102 indicates which PF information it is interested in. To support this, the WDC 104 at a minimum is able to understand the following QueryInput values: (1) /WDC/pfInfo/ (to select that the WD wants to receive the PF Info for all PFs managed by the WDC 104), and (2) /WDC/pfInfo/#/state="available" (to select that the WD 102 wants to receive the PF Info for only PFs managed by the WDC 104 with status "available").

If the WDC 104 accepts the request, in S306 the WDC 104 sends a UPnP Action Response message to the WD 102 with the actionNameResponse set to "GetPfInfo", and with output argument 'PfInfoList' containing the information of the list of PFs matching the requested query input received through argument 'QueryInput'.

If the WDC 104 rejects the request, in S306 the WDC sends a UPnP Action Response message to the WD 102 with the 'errorCode' field set to a proper value.

Additionally or alternatively to the signaling described above in S304 and S306, it is possible that the WDC 104 would like to limit the amount of information provided based on the "User Level Access" that a given WD 102 is allowed to have (e.g. based on its authentication). This can be realized by one or more of the following methods.

In one example, alternatively to signaling described in S304, in S308 the WD 102 in QueryInput signals to WDC 104 that it would like to limit the response to the peripherals that meet the Query Input criteria (e.g. all or State Available . . . etc), and the peripherals to which it has "Access to" based on its authentication (e.g. a Boolean Variable: 0=no limitation, 1=limit to User Authentication allowed Peripherals). Accordingly, alternatively to signaling in S306, in S310 the WDC 104 in PfInfolist can limit the peripherals that the WD has access to. If there is no need for a "User Level Authentication" based access to the Peripehrals, the WDC 104 ignores the signaling from WD 102 about the "access based limitation".

In another example, alternatively to signaling in S306 or S310, in response to an peripheral access limitation request in S312, in S314 the WDC 104 in the PfInforList (Peripheral Information List), along with the "State" of the Peripheral, also includes a Parameter "Access Level" to signal to the WD 102 if it is allowed to use the peripheral or not. An example implementation can be an "Access Level" parameter (e.g. a Boolean (0 or 1 value) variable with "1" indicating that the WD 102 can access the peripheral, "0" indicating that the peripheral cannot be used (or) cannot be used with the current level of access rights that are allowed for the WD 102).

According to certain aspects of the invention, without the knowledge of the limitation on the use of a peripheral for the WD 102, once the WD 102 makes a selection of such a peripheral, the WDC 104 can choose to not include the peripheral in the docking session. This results in WD 102 not knowing why the peripheral is not included in the docking session and this can result in the WD 102 making repeated attempts to select the peripheral. Allowing for the signaling to limit the peripherals to "User Authentication" requirements limits the amount of data exchange and also limits the WD 102 from selecting a peripheral that it is not allowed to use. This can help in power saving at the WD 102.

Although the present invention has been particularly described with reference to the preferred embodiments thereof, it should be readily apparent to those of ordinary skill in the art that changes and modifications in the form and details may be made without departing from the spirit and scope of the invention. It is intended that the appended claims encompass such changes and modifications.

What is claimed is:

1. A method comprising:
  initiating a WiFi docking session between a WiFi Dockee (WD) and a WiFi Docking Station (WDC);
  providing, after the initiation of the WiFi docking session, a list of peripherals that are accessible by the WDC to the WD, wherein one of the peripherals is in a first state;
  receiving a selection from the WD comprising the one peripheral selected from the list of peripherals and a second state that the WD desires for use of the one peripheral; and
  monitoring by the WDC, the one peripheral selected from the list of peripherals to determine availability of the one peripheral in the second state.

2. A method according to claim 1, wherein the selected second state is associated with a connection topology that is desired by the WD.

3. A method according to claim 1, further comprising:
  receiving an indication that the one peripheral be in the selected second state before adding by the WDC as part of the WiFI docking session is required;
  determining the one peripheral is unavailable in the selected second state as part of the WiFi docking session; and
  rejecting the selection of the one peripheral in the selected second state.

4. A method according to claim 1, further comprising:
  receiving an indication that the one peripheral is not required to be in the selected second state before adding by the WDC as part of the WiFI docking session;
  determining the one peripheral is unavailable in the selected second state as part of the WiFi docking session; and
  adding the one peripheral in the WiFi docking session.

5. A method according to claim 1, further comprising:
  adding, by the WDC, the one peripheral in the WiFi docking session in an initial state that is one of the first and second states;
  receiving instructions to change the one peripheral from the initial state to a different state; and
  changing the one peripheral from the initial state to the different state in response to the received instructions.

6. A method according to claim 5, wherein either the initial state or the different state allows for the WD to exclusively access the one peripheral, and the other state of the initial state or the different state allows for other devices to access the one peripheral via the WDC.

7. A method according to claim 1, wherein a second one of the peripherals is not available, the method further comprising:
  receiving a request selecting the second peripheral to be added in the WiFi docking session; and
  adding the second peripheral to the WiFi docking session in response to the received request.

8. A method according to claim 7, further comprising:
  monitoring, by the WDC, the second peripheral to determine availability of the second peripheral.

9. A method according to claim 1, further comprising:
receiving at the WDC from the WD a request selecting another one of the peripherals to add in the WiFi docking session; and
notifying the WD of a reason why the another peripheral is not added in the WiFi docking session.

10. A method according to claim 9, wherein the notification includes one of: a user authentication failure, insufficient resources, peripheral usage conflict, and peripheral states of occupied, sleep, disconnected and unpaired as reasons for not adding the another peripheral in the WiFi docking session.

11. A method according to claim 1, further comprising:
requesting user credentials for use of certain of the peripherals.

12. A method, comprising:
initiating a WiFi docking session between a WiFi Dockee (WD) and a WiFi Docking Station (WDC);
receiving a list of peripherals, after initiation of the WiFi docking session, that are accessible by the WDC, wherein one of the peripherals in the received list of peripherals is in a first state;
sending to the WDC a selection comprising the one of the peripherals selected from the list of peripherals and a second state that the WD desires for use of the one of the peripherals; and
receiving from the WDC, a notification that the one of the peripherals selected from the list of peripherals is available in the second state.

13. A method according to claim 12, further comprising:
providing a user level associated with the WD; and
receiving limited information about the one of the peripherals based on the user level.

14. A method according to claim 13, further comprising:
receiving a notification from the WDC of a reason why the WD is denied access to the one of the peripherals.

15. A system comprising:
a WiFi Dockee (WD);
a WiFi Docking Station (WDC);
a plurality of peripherals that are accessible by the WDC, wherein one of the peripherals is in a first state;
wherein the WDC is configured to provide, after initiation of a WiFi docking session with the WD, a list of the plurality of peripherals to the WD;
a signaling protocol between the WD and the WDC for selecting the one of the peripherals from the list of the plurality of peripherals, a second state that the WD desires for use of the one of the peripherals; and
wherein the WDC is further configured to monitor the one of the peripherals selected from the list of peripherals to determine availability of the one peripheral in the second state.

16. A system according to claim 15, wherein the selected second state is associated with a connection topology that is desired by the WD.

17. A system according to claim 16, wherein the connection topology is one of direct and relay.

18. A system according to claim 15, wherein the WDC is further configured to:
add the one of the peripherals in the WiFi docking session in an initial state that is one of the first and second states;
receive instructions to change the one of the peripherals from the initial state to a different state; and
change the one of the peripherals from the initial state to the different state in response to the received instructions.

19. A system according to claim 18, wherein either the initial state or the different state allows for the WD to exclusively access the one of the peripherals, and the other state of the initial state or the different state allows for other devices in the system to access the one of the peripherals via the WDC.

20. A system according to claim 15, wherein the one of the peripherals is one of a printer, a monitor, a scanner or a keyboard.

21. A system according to claim 15, wherein the one of the peripherals is connected to the WDC via a wired connection.

22. A system according to claim 15, wherein the one of the peripherals is connected to the WDC via a wireless connection.

23. A system according to claim 22, wherein the wireless connection is one of Bluetooth, WiFi and WiFi Direct.

* * * * *